April 15, 1930.  I. J. BEVINS  1,754,708
APPARATUS FOR CLEANING AUTOMOTIVE POWER PLANTS
Filed April 5, 1926
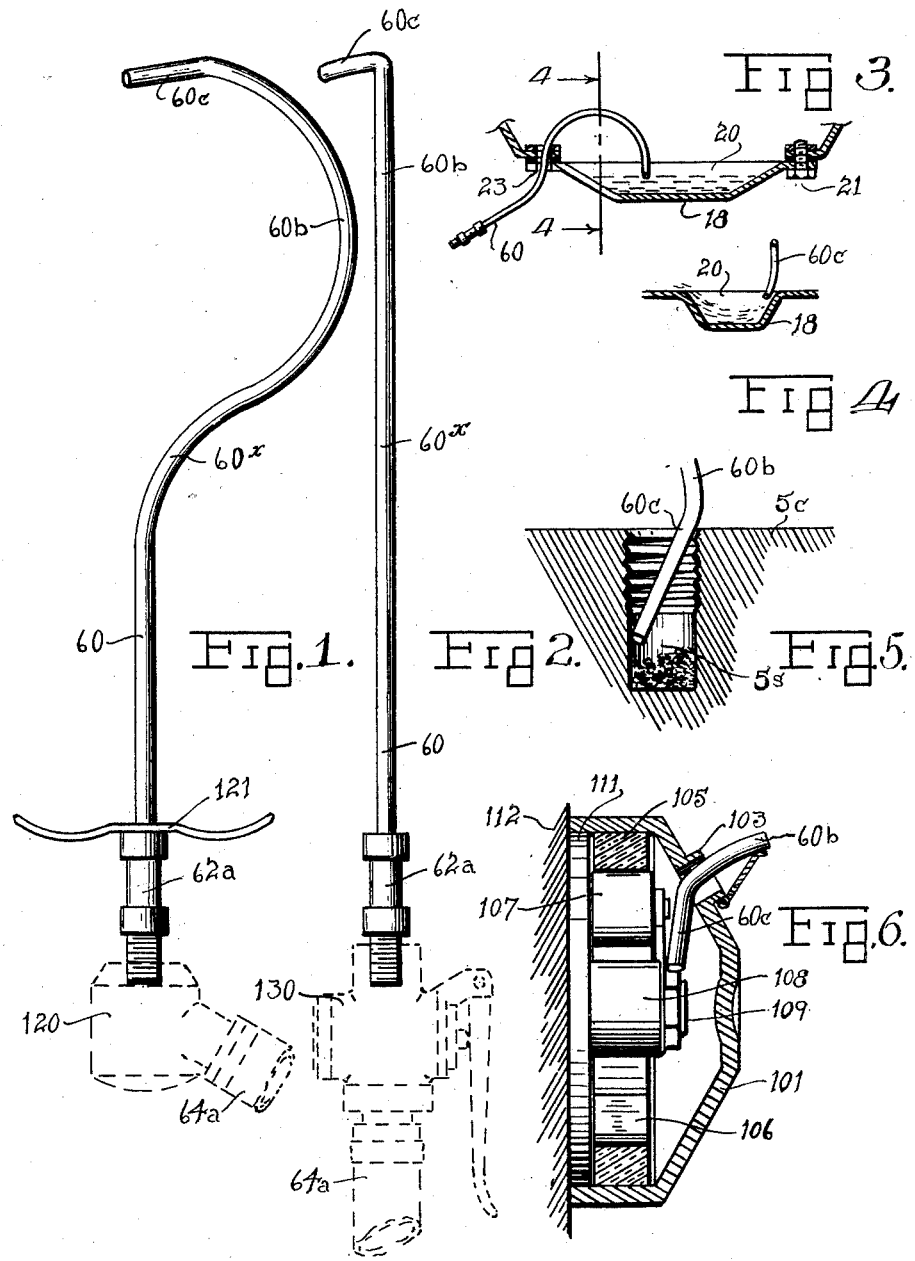
INVENTOR
I. J. Bevins
BY
Myron P. Laughlin.
ATTORNEY Patented Apr. 15, 1930

1,754,708

UNITED STATES PATENT OFFICE

IRA J. BEVINS, OF CHICAGO, ILLINOIS

APPARATUS FOR CLEANING AUTOMOTIVE POWER PLANTS

Application filed April 5, 1926. Serial No. 99,788.

This invention relates to the cleaning of internal combustion engines, and more especially to apparatus for cleaning automotive power plants.

It is the purpose of this invention to provide means whereby the internal parts of an automobile engine, transmission and gears may be cleansed and whereby the cleaning fluid may be thoroughly purged from the engine, transmission, or gears before lubricant is again introduced.

In cleansing automotive machinery, the time available is usually limited, and it is often impossible to dismantle and remove the various parts. On the other hand, automotive machinery usually operates at high speed, and especially requires the benefit of the maximum lubricating qualities of the lubricant employed, and a complete removal of cleansing fluid from the lubricant passageways.

The herein disclosed invention permits the use of any desired cleansing material or fluid, provides for its use and application to the parts to be cleansed, and especially provides for its complete removal, together with any sediment or other material which may have been washed from the parts. As is essential in systems which are to be used by the average automotive operator or mechanic, it is simple, easily applied, requires no special operating knowledge, and can be practiced with a minimum removal of automobile parts; while the specific apparatus described and specifically claimed in this application is particularly adapted for use under existing conditions, and with a minimum of delay and inconvenience to the car owner and operator.

The attached drawing will serve to show embodiments of my invention and to illustrate their application to a well known form of automobile power plant, it being understood that other applications and modifications are contemplated with other parts and forms of power plant well known to those skilled in the art.

Fig. 1 is a side elevation of my improved form of nozzle, and illustrates certain details of my invention especially suited for use with fluid supply lines terminating in controlling devices, chucks or valves.

Fig. 2 is a rear elevation of the nozzle shown in Fig. 1, a trigger valve being indicated at the fluid line terminus.

Fig. 3 illustrates the application of my invention to one type of splash trough supplied for engine lubrication.

Fig. 4 is a fragmentary section of Fig. 3, taken on line 4—4 of Fig. 3.

Fig. 5 serves to show a further application of my invention to the cleansing of pockets in the engine casing, and more specifically to stud holes.

Fig. 6 shows in partial cross section, an engine timer and the application of my nozzle and method to the cleaning thereof.

In the drawings, particularly in Figs. 1 and 2, I have illustrated my improved form of nozzle for use in the application of a cleansing fluid to certain parts of an automobile mechanism, and to assist in removing sediment and cleansing fluid from said parts, while in Figs. 3, 4, 5 and 6, I have shown certain parts of an automobile with my improved nozzle in place for the above purpose, and it is manifest that my device may also be employed for cleansing and lubricating various other parts of an automotive engine, not shown.

Referring more particularly to Figs. 1 and 2 of the drawing, 60 designates an elongated nozzle, which may be secured by a threaded connection, to a suitable hose or conduit $64^a$.

Nozzle 60 is preferably curved as at $60^x$, such curve being preferably tangent to the straight section or sections of the nozzle adjacent the connection portion $62^a$. In the embodiment of the invention shown in Figs. 1 and 2, the curved section $6^x$ is extended into a second section $60^b$, tangent to the first, while the nozzle is terminated preferably in a section $60^c$ of lesser curvature or substantially straight, so as to adapt it particularly for reaching the bottom, or a substantial depth, into constricted places, as the stud hole $5^s$ in the cylinder casting $5^c$ of an engine, as shown in Fig. 5; or the interior mechanism of a timer, as shown in Fig. 6.

Timers such as that shown in Fig. 6, commonly consist of a shell 101, provided with an oiling opening 103, an insulated ring 105, mounting contacts 106, over which ring and contacts, the roller 107 is driven by the arm 108, secured to the timer shaft 109. This type of timer is mounted on an extension 111 of the engine crankcase 112, near the bottom and at the front of the crankcase, so that it is exposed to dirt, water, and dirty oil, and requires cleaning at frequent intervals. My improved nozzle shown is particularly adapted for cleaning and drying such timers, without their being removed from the engine.

In the use of my device for lubricating and cleaning timers of the character shown in Fig. 6, it will be seen that a cleaning fluid may be forced through the hose or conduit 64$^a$ from some suitable source of supply, not shown, into the nozzle 60. The operator may then place the section 60$^c$ of the nozzle 60, into the oiling opening 103 of the timer, and in this way, the oil or other cleaning fluid will flow into the timer and thereby clean the different parts within the shell of the timer. As an aid to the operation of my device, the starter of the engine may be employed to slowly rotate the timer parts, and further aid the cleaning of the different parts of the mechanism undergoing treatment.

After the parts have been thoroughly cleaned in the above manner, the hose or conduit 64$^a$ may be disconnected from the cleaning fluid supply, and connected to a tank or other compressed air container, not shown, for the purpose of introducing air under pressure into the part being cleaned and lubricated. The air will flow from the source of supply, into the hose 64$^a$, and thence through the nozzle 60. At this point, the operator may again insert the nozzle 60 into the oiling opening 103 of the shell 101 of the timer, thus permitting a discharge of air from the nozzle, into the timer, for thoroughly cleansing the parts of sediment and dirt loosened by the cleansing fluid previously introduced. This removes the cleaning fluid completely and thoroughly drains the timer. The starter of the engine may again be employed to slowly rotate the parts and further aid the cleansing and drying operation. The parts thus cleaned and dried are then ready to receive some suitable lubricant, without danger of the latter being mixed with dirt or cleaning oil.

In cases where a ready source of compressed air or other cleaning gas is available at the usual hose 64$^a$, terminating in an automatic valve or chuck 120, as indicated in the dotted lines in Fig. 1, I prefer to use a modified hose connection 62$^a$, and to mount thereabove, a finger piece 121, enabling the operator to rest the chuck 120 in the palm of the hand, and gripping the fingers over piece 121 to direct the jet, and at the same time, control the air supply, since pressing a fitting into such chucks commonly opens the valve therein, while withdrawal cuts off flow. Where the air hose terminates in a "trigger valve" 130, as indicated by the dotted lines in Fig. 2, however, the finger piece 121 is preferably omitted, and the connection 62$^a$ screwed directly into the valve, as shown. Where other sources of air are temporarily unavailable, it has been found practical to utilize a tire, or tires of the vehicle, as such air supply, it being understood that it is preferable to use a spare tire when the motor vehicle is so equipped.

By ordinary methods, it is practically impossible to remove sediment and cleansing fluid from troughs 20 and similar catch basins in the lower portion of the main oil reservoir of an engine, thus, when new lubricant is introduced into the engine, it becomes mixed with cleaning fluid and dirt, which, upon operation of the engine, is immediately thrown over the engine parts, thereby nullifying such cleaning as has been accomplished.

A special feature of my improved apparatus is the provision for evacuating these catch pockets or troughs 20. This is accomplished in the following simple manner by the use of my special nozzle or jet 60. As shown in Figs. 3 and 4, when a stud bolt 21, 23, such as one of those securing the usual crankcase bottom plate 18, is removed, the troughs 20 may then be thoroughly blown out by the jet of air issuing from nozzle 60. It will be seen from these Figures 3 and 4, that my improved nozzle, when inserted through the hole thus provided, will extend over and dip into the troughs 20, thereby insuring a complete contact of the air or cleansing fluid with all parts of the trough, and effecting a thorough cleaning and drying operation.

It will be noted that the apparatus is simple, easy of application, inexpensive, readily transportable in the tool space of the motor car, adapted to clean the most inaccessible parts with a minimum of dismantling, and operable by the most inexpert. The improvements effected by this invention can be particularly appreciated when consideration is given to the lubricating difficulties so prevalent in automobile operation, and the fact that removal of sediment and cleansing fluids, as disclosed in this application, will aid in the elimination of many such difficulties.

From the foregoing it is believed that the construction, operation and advantages of the invention may be readily understood, and I am aware that various changes may be made in the details disclosed, without departing from the spirit of the invention, as expressed in the claim.

I claim:—

In a jet nozzle, a hose bibb, a substantially rigid tube extending from the end of said bibb, said bibb having a portion of lesser diameter than its main body to which the fluid conductor hose may be attached and a central bore extending therethrough, said central bore serving as a fluid duct to and as a mounting for said tube, said rigid tube having a straight portion adjacent its attachment to said bibb an outwardly curved portion at the end of said straight portion, a reverse curved portion extending from said outwardly curved portion and a terminal portion relatively shorter than any of the aforesaid portions and angularly offset from the common plane of said curved portions.

In witness whereof I have hereunto set my hand at Chicago, Illinois, this 24th day of March, 1926.

IRA J. BEVINS.